United States Patent Office 2,718,522
Patented Sept. 20, 1955

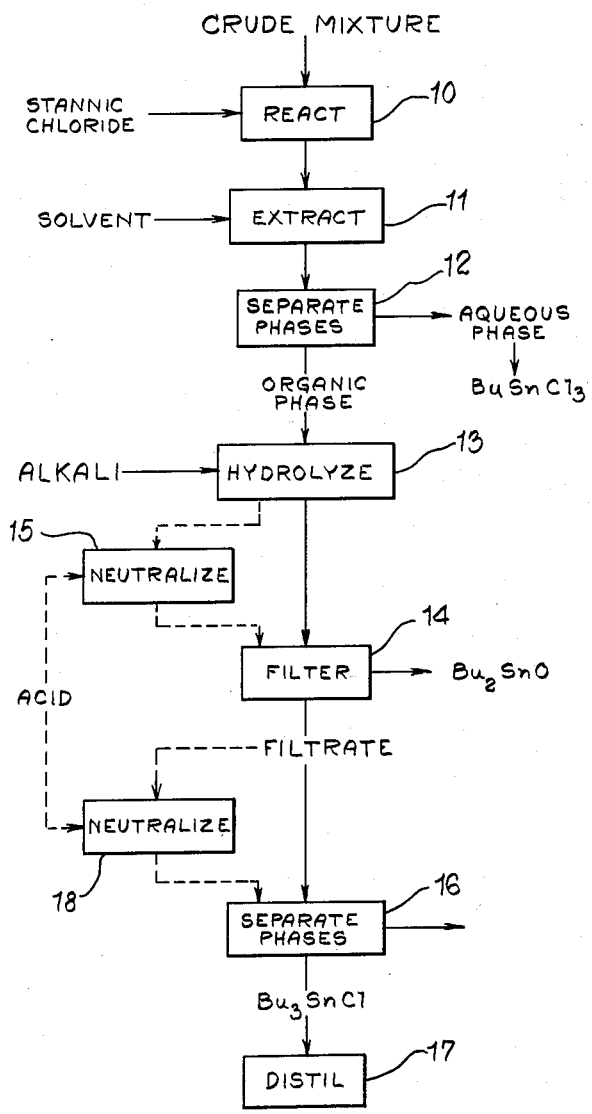

2,718,522

RECOVERY OF ORGANOTIN COMPOUNDS

Carl R. Gloskey, Avenel, N. J., assignor to Metal & Thermit Corporation, New York, N. Y., a corporation of New Jersey Application June 10, 1953, Serial No. 360,768

3 Claims. (Cl. 260—429)

This invention relates to the treatment of crude mixtures of alkyl tin chlorides, particularly butyl tin chlorides. More particularly, it relates to the separation and recovery of tributyl tin chloride in pure form and good yield from these mixtures. The invention further relates to the separation and recovery of other butyl tin compounds.

Heretofore, difficulty has been experienced in obtaining pure tributyl tin chloride from crude mixtures, such as those obtained by reacting stannic chloride and tetrabutyl tin, which contain it. Straightforward recovery steps like distillation and fractional crystallization, and procedures like complexing the reaction products with ammonia, have not been successful in producing pure tributyl tin chloride. According to the invention, it is proposed to subject a crude mixture of the kind described to a series of steps each designed to remove a definite component from the mixture. As is understood, these crude mixtures usually comprise tributyl tin chloride and tetrabutyl tin in more or less substantial amounts and may also contain dibutyl tin dichloride, butyl tin trichloride, and/or inert hydrocarbon material. The invention, in brief, comprises the removal of the tetrabutyl tin by reaction with stannic chloride, the selective extraction of butyl tin trichloride, the conversion of the dibutyl tin dichloride to dibutyl tin oxide and the removal of the latter, and the tributyl tin chloride which remains is taken as the desired product and may be purified if necessary by simple distillation. As will be apparent, the method enables other valuable products to be recovered besides the monochloride. The inert hydrocarbon material may be removed, as by distillation, either at the beginning or at the end of the process.

The invention may be better understood by referring to the accompanying drawing in which a diagrammatic flow sheet is presented which illustrates the various steps of the method and also some optional procedures. Assuming that the crude mixture contains butyl tin trichloride, dibutyl tin dichloride, tributyl tin chloride, tetrabutyl tin, and inert hydrocarbons, it is first subjected to a reaction in zone 10 with stannic chloride, the purpose of which is to react the tetrabutyl tin with the stannic chloride and thus remove the former compound from the mixture. At the same time, this reaction results in the production of additional quantities of tributyl tin chloride and butyl tin trichloride. The reaction is preferably carried out at a temperature in the range of 0° C. to room temperature, although temperatures as high as 50 to 100° C. may be employed. No external heat is applied to the mixture in zone 10 either during mixing of the reactants or during reaction. The amount of stannic chloride used for the reaction should be equivalent, mol for mol, to the amount of tetrabutyl tin present in the crude, and it is desirable to add the stannic chloride to the crude slowly in order to hold down the temperature of the resulting mixture. The reaction between the stannic chloride and the tetrabutyl tin proceeds rapidly and is completed in a few minutes.

The mixture in zone 10 is then extracted with a selective solvent for the trichloride compound, the extraction being carried out either in zone 10 or, as indicated in the drawing, in zone 11. The mixture is preferably extracted while it is still cold, although it need not be chilled during the extraction; conveniently, it may be allowed to warm up to room temperature during mixing with the solvent. The solvent is a dilute aqueous solution of an acid, preferably a mineral acid such as hydrochloric, sulfuric and phosphoric. Formic, acetic, propionic, lactic, and fluosilicic acids may also be employed. It is preferred to avoid oxidizing acid solutions. The acid should be one strong enough to prevent hydrolysis of the butyl tin chlorides, and the concentration of the acid in the solution should be chosen with this point in mind. As an example, a 10% hydrochloric acid solution is suitable, as is also a solution having from 1 to 25%, or even to 33–34%, by weight of HCl. Other acids, if used, are employed in concentrations equivalent to the foregoing concentrations of hydrochloric acid. The total amount of acid used, relatively to the amount of material being extracted in zone 11, should be sufficient to efficiently extract the trichloride. A batch or continuous method of extraction may be used.

Following extraction, the mixture is separated in zone 12 into two phases: a lighter organic phase comprising mainly tributyl tin chloride and some dichloride and inert material, and a heavier aqueous phase containing dissolved trichloride. The aqueous phase is removed as shown and may be subjected to any suitable treatment for recovering the trichloride, such as neutralization followed by evaporation, or a chemical recovery step. The organic phase is passed to zone 13 where the dibutyl tin dichloride is hydrolyzed to form dibutyl tin oxide which precipitates out of the solution. The hydrolysis agent is a dilute aqueous solution of an alkali, preferably a mild alkali such as sodium carbonate, sodium bicarbonate, potassium carbonate, potassium bicarbonate, ammonium carbonate, and ammonium bicarbonate. An aqueous solution of ammonia is also suitable. A 1% by weight solution of the alkali is a preferred concentration; other suitable concentrations are solutions containing 1 to 5% by weight of alkali. The total amount of alkali should be just sufficient for the hydrolysis, that is, equivalent to the amount of dichloride present in the mixture passed to zone 13.

Following hydrolysis, the mixture is passed to zone 14 where the butyl tin oxide precipitate is filtered out. However, if too much alkali was added in zone 13, it is preferred to pass the mixture to zone 15 for neutralization with acid, care being taken to avoid redissolving the butyl tin oxide, the neutral mixture then being passed to filter zone 14. The filtrate from the latter zone, comprising tributyl tin chloride, is then separated in zone 16 into two phases, the heavier of which contains the tributyl compound, and this phase, if not sufficiently pure for the purpose desired, may be distilled in zone 17 to obtain the pure material. Tributyl tin chloride having a purity of 98% or better is obtainable from zone 16, and by distillation a 100% pure material can be recovered. The lighter phase from zone 16, comprising water, any inert hydrocarbon material, and dissolved salt of neutralization, is removed.

Instead of neutralizing the effluents from zone 13 prior to filtration, neutralization, when necessary, can be performed in zone 18 after filtration, as indicated, and the neutralized filtrate passed to zone 16. Preferably neutralization, when necessary, is performed prior to filtration.

The inert hydrocarbon material, particularly if present in appreciable amounts, may be separated by distillation either at the beginning of the process, that is, prior to the reaction in zone 10, or at the end of the process.

The invention may be illustrated by the following examples:

Example 1

A crude mixture totaling 776.5 gms. and comprising:

|  | Grams | Percent |
|---|---|---|
| dibutyl tin dichloride | 2.5 | 0.17 |
| tributyl tin chloride | 500.0 | 64.46 |
| tetrabutyl tin | 264.0 | 34.07 |
| inert material | 10.0 | 1.32 |

The inert material comprised hydrocarbons. The total tin content of the crude mixture was 35.16% and the total chlorine content was 7.02%. To the mixture, maintained at 0° C., there was added a quantity of stannic chloride which was the molar equivalent of the amount of tetrabutyl tin in the mixture. The stannic chloride was added slowly to keep the temperature of the mixture low. Reaction of the stannic chloride with the tetrabutyl tin takes place at once, forming butyl tin trichloride and tributyl tin chloride. Then to the cold reaction mixture there was added 925 grams of a 10% hydrochloric acid solution which contained a total of 250 grams of HCl. The resulting mixture was agitated well without applying heat and then left to stand until separation of phases occurred. The upper layer or phase, comprising organic material, was separated from the lower aqueous phase and comprised a total of 745 grams of material. The lower phase comprised the aqueous hydrochloric acid solution and butyl tin trichloride dissolved therein, a total of 1141 grams of this phase being obtained of which 221 grams were butyl tin trichloride. The butyl tin trichloride is recoverable by neutralizing the aqueous phase and evaporating the water. The organic material of the upper phase, comprising mainly tributyl tin chloride and some dibutyl tin dichloride and inert material, was subjected to alkaline hydrolysis at room temperature by adding to it, with stirring, approximately 1000 grams of a 1% aqueous solution of sodium carbonate, a precipitate of dibutyl tin oxide being formed. The over-all mixture was filtered to remove the oxide precipitate, about 108 grams of the latter being obtained which was equivalent to 135 grams of dibutyl tin dichloride. The filtrate was neutralized with dilute hydrochloric acid solution, and the resulting mixture allowed to stand, a good phase separation being obtained in which the phases comprised an upper aqueous layer containing dissolved sodium chloride formed in the neutralization step and a lower layer comprising tributyl tin chloride having a purity of more than 98%. The tributyl tin chloride layer was distilled, a very pure product being obtained which analyzed as follows:

|  | Example 1 | Theoretical |
|---|---|---|
| Percent tin | 36.2 | 36.4 |
| Percent chlorine | 11.1 | 10.9 |
| Percent dibutyl tin dichloride | trace |  |

The recovery of the various butyl tin chlorides is as follows:

|  | Grams | Percent Purity |
|---|---|---|
| tributyl tin chloride | 601 | 99.4 |
| butyl tin trichloride (recovered in aqueous solution) | 221 |  |
| dibutyl tin dichloride (recovered in the form of dibutyl tin oxide) | 135 |  |

Example 2

A crude mixture totaling 148.8 gms. and comprising:

|  | Grams | Percent |
|---|---|---|
| dibutyl tin dichloride | 1.6 | 1.07 |
| tributyl tin chloride | 124.9 | 83.93 |
| tetrabutyl tin | 21.1 | 14.18 |
| inert hydrocarbon | 1.2 | 0.82 |

The total tin content of the crude mixture was 35.88% and the total chlorine content was 9.39%. The mixture was chilled to 0° C. and stannic chloride was added in an amount equivalent, mol for mol, of the amount of tetrabutyl tin in the mixture. Following reaction of the stannic chloride with the tetrabutyl tin, the cold reaction mixture was extracted with 10% hydrochloric acid solution, the phases separated, and the upper phase, which contained some dibutyl tin dichloride, was treated with a weak aqueous solution of ammonia to hydrolyze the dichloride to dibutyl tin oxide. The oxide precipitate was filtered off from the tributyl tin chloride material, and the latter was distilled, giving tributyl tin chloride boiling at 145° C. at 10 mm. and having the following analysis:

|  | Example 2 | Theoretical |
|---|---|---|
| Percent tin | 36.14 | 36.4 |
| Percent chlorine | 10.90 | 10.9 |
| density, 25° C | 1.2015 |  |
| molecular weight | 315 | 325 |

The original crude mixture that is treated by the present method may comprise tributyl tin chloride and tetrabutyl tin, and the amount of the latter may vary widely, as from 1% or less to about 90%. Mixtures of tetrabutyl tin, tributyl tin chloride, and dibutyl tin dichloride, may also be processesd; the dichloride may vary from a trace to 5% or more. Butyl tin trichloride may be present in the foregoing mixtures; this compound is one of those formed during the reaction in zone 10, and whether present initially or formed in zone 10, it is extracted and removed in zone 12. It will be understood, of course, that the steps of the method will apply only to the compounds present or formed in the mixture; if any of the foregoing compounds is not present, then the step for removing it is omitted.

In the light of the foregoing description, the following is claimed:

1. The method of recovering tributyl tin chloride from a mixture comprising tributy tin chloride, dibutyl tin dichloride, butyl tin trichloride, and tetrabutyl tin which comprises adding stannic chloride to the mixture at a temperature in the range of 0° C. to room temperature, thereby reacting the tetrabutyl tin with the stannic chloride to produce tributyl tin chloride and butyl tin trichloride and thus removing the tetrabutyl tin from the mixture, the amount of stannic chloride added being the same, mol for mol, as the amount of tetrabutyl tin present in the mixture; then extracting the mixture with a dilute aqueous non-oxidizing mineral acid to selectively remove butyl tin trichloride therefrom by solution in said dilute acid solution, separating from the mixture the extract comprising said dilute acid solution and dissolved butyl tin trichloride; adding a dilute solution of a mild alkali to the remaining portion of said mixture to hydrolyze the dibutyl tin dichloride to a precipitate of dibutyl tin oxide, separating said precipitate from said portion; and recovering tributyl tin chloride from said portion.

2. The method of recovering tributyl tin chloride from a mixture comprising tributyl tin chloride, dibutyl tin dichloride, butyl tin trichloride, and tetrabutyl tin which comprises adding stannic chloride to the mixture while applying no external heat thereto, thereby reacting the tetrabutyl tin with the stannic chloride to produce tributyl tin chloride and butyl tin trichloride and thus removing the tetrabutyl tin from the mixture, the amount of stannic chloride added being the same, mol for mol, as the amount of tetrabutyl tin present in the mixture; then extracting the mixture with a dilute aqueous non-oxidizing acid solution to selectively remove butyl tin trichloride therefrom by solution in said dilute acid solution, separating from the mixture the extract comprising said dilute acid solution and dissolved butyl tin trichloride; adding dilute alkali solution to the remaining portion of said mixture to hydrolyze the dibutyl tin dichloride to a precipitate of dibutyl tin oxide, separating said precipitate from said portion; and recovering tributyl tin chloride from said portion.

3. The method of recovering tributyl tin chloride from a mixture comprising tributyl tin chloride and tetrabutyl tin which comprises adding stannic chloride to the mixture while applying no external heat thereto, thereby reacting the tetrabutyl tin with the stannic chloride to produce tributyl tin chloride and butyl tin trichloride and thus removing the tetrabutyl tin from the mixture, the amount of stannic chloride added being the same, mol for mol, as the amount of tetrabutyl tin present in the mixture; then extracting the mixture with a dilute aqueous non-oxidizing acid solution to selectively remove butyl tin trichloride therefrom by solution in said dilute acid solution, separating from the mixture the extract comprising said dilute acid solution and dissolved butyl tin trichloride; and recovering tributyl tin chloride from the remaining portion of said mixture.

References Cited in the file of this patent

UNITED STATES PATENTS

| | | |
|---|---|---|
| 2,560,042 | Eberly et al. | July 10, 1951 |
| 2,569,492 | Passino et al. | Oct. 2, 1951 |
| 2,599,557 | Johnson et al. | June 10, 1952 |